Figure 3:
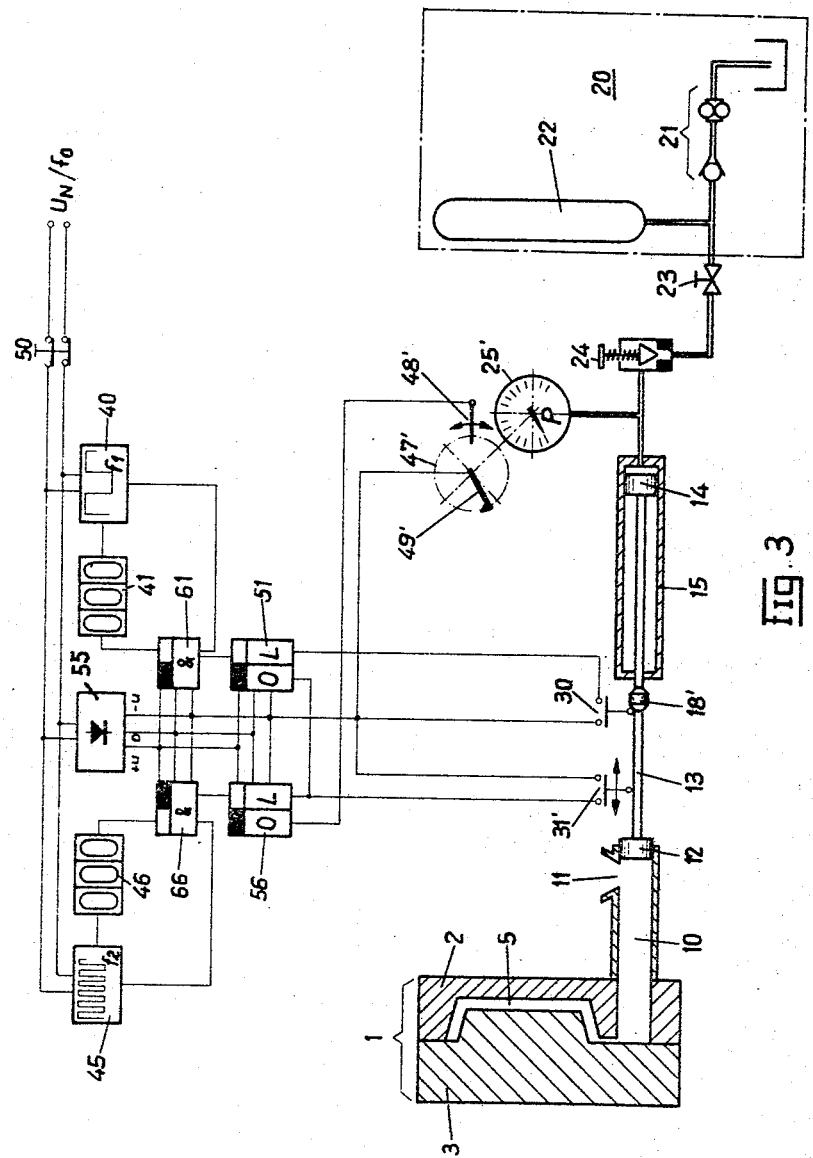

July 11, 1967  U. EGGENBERGER ET AL  3,330,003
PRESSURE AND INJECTION MOULDING MACHINE
Filed Sept. 28, 1964  3 Sheets-Sheet 1
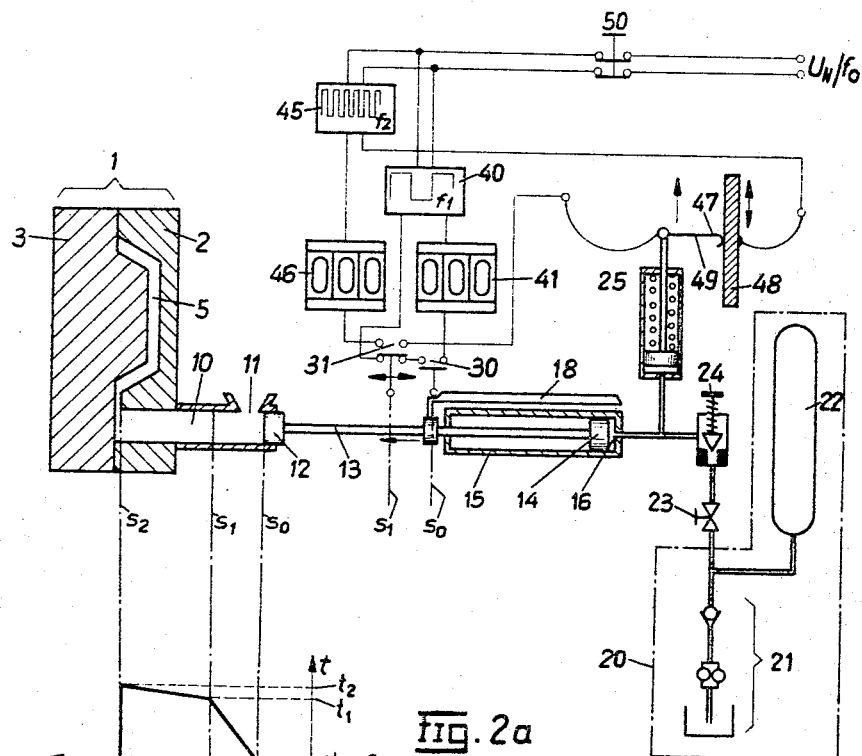
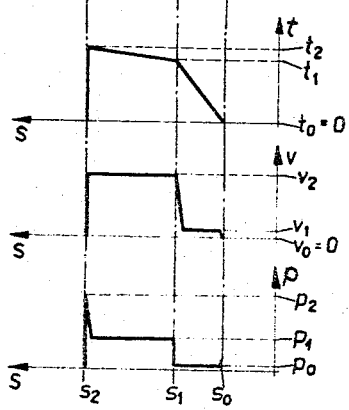
INVENTORS
ULRICH EGGENBERGER
WALTER SCHWERTFEGER

INVENTORS
ULRICH EGGENBERGER
WALTER SCHWERTFEGER

By: McGlew and Toren,
attorneys

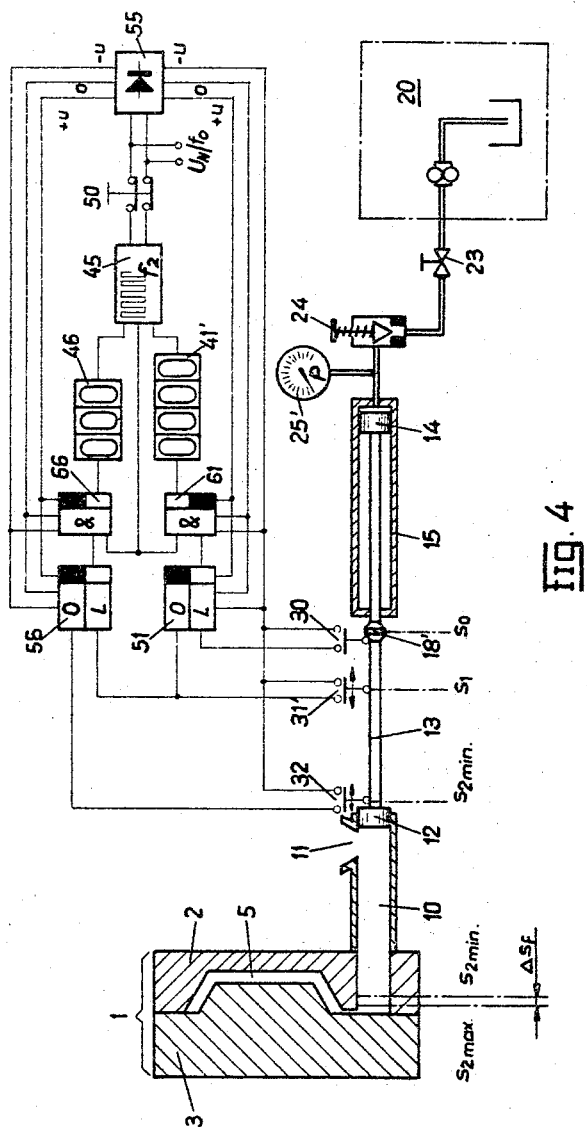

United States Patent Office 3,330,003
Patented July 11, 1967

3,330,003
PRESSURE AND INJECTION MOULDING
MACHINE
Ulrich Eggenberger, Oberuzwil, and Walter Schwertfeger, Uzwil, Switzerland, assignors to Gebrüder Bühler, Uzwil, Switzerland
Filed Sept. 28, 1964, Ser. No. 399,649
Claims priority, application Switzerland, Sept. 30, 1963, 12,132/63
15 Claims. (Cl. 18—30)

The present invention relates to a pressure and injection moulding machine with a working system to press liquid casting material into a mould hollow space and adjustable control elements to regulate a selected operation program.

Pressure and injection moulding machines with devices and control elements for setting an adjustable working diagram, taking into consideration the mould form, the temperature of the casting material and of the injection pressure, with means to regulate adjustable pressures different one from the other during the slow injection and mould filling phases, as well as with means to modify the working diagram during a mass production, are already known. However, it is proved that the application of these known means are insufficient for the mass production of certain castings.

The present invention provides means for measuring the effective injection time, preferably also for the measuring of the slow injection as well as for the measuring of the mould filling time of each moulding operation. This permits detection of changes due to certain non-influenceable parameter magnitudes of the diagram, causing changes of measured injection time, with respect to both phases of the injection. It further provides for either manual or automatic adjustment of influenceable parameter magnitudes to compensate for these changes and thus to correct in accordance with the working diagram.

Examples of the execution of the pressure and injection moulding machine which is the subject of the present invention, each with a survey device of the working diagram is shown schematically on the drawing.

FIG. 1 shows the schema of the mould, including the injection system, of a pressure moulding machine with an injection time measuring device of the first execution form, FIG. 2 shows 3 working diagrams of the injection system of FIG. 1, wherein FIG. 2a is a course-time-diagram,
FIG. 2b is a course-speed-diagram,
FIG. 2c is a course-pressure-diagram, FIG. 3 shows the schematic presentation of the mould, the injection system and the injection time measuring device of the second execution form, FIG. 4 shows the schematic presentation of the mould and injection-system of a pressure moulding machine similar to FIGS. 1 and 3 with a third execution form of the injection time measuring device.

According to FIG. 1, an injection casting mould consists of a fixed mould half 2 and a movable mould half 3. These parts enclose the mould hollow space or cavity 5 for the piece to be moulded. The fixed mould half 2 includes a filling box 10 with a filling opening 11 for the reception of the liquid casting material.

The filling box 10 constitutes the guiding cylinder for the stamp or piston 12 which serves to press the casting material into the mould cavity 5. The stamp 12 is connected by a piston rod 13 with an injection piston 14 which is disposed in a displaceable manner and an injection cylinder 15 and which is moved by the effect of a pressure medium. The pressure medium fed to the injection cylinder 15 comes from a pressure medium source 20 which consists of a pressure pump with a non-return valve 21 and an accumulator 22, according to FIG. 1. Between the pressure medium source 20 and the injection cylinder 15 at least shut-off valve 23 and at least throttle valve 24, which are operated in the well known manner, are mounted. The pressure existing momentarily in the pressure space 16, between the injection cylinder 15 and the injection piston 14, acts simultaneously on a pressure indicator 25.

A trip cam 18 is mounted in a fixed connection on the piston rod 13. A stationary electrical switch 30 is positioned at the piston course point $s_0$, and a commutator or double throw switch 31 is positioned at an adjustable piston course point $s_1$. Switches 30 and 31 are arranged to be operated by a switching cam 18. A switch 47, comprising a sliding contact 49, which is mechanically connected with the movable part of the pressure indicator 25, and a contact rail 48, adjustable to a definite pressure value $p_2$ are operatively associated with the pressure indicator 25. A feeding electric network $U_N$ with a basic frequency $f_0$ supplies operating potential to the control elements through a release or circuit interruptor 50. The operating potential is provided to two electric circuits including switches 30, 31 and 47, pulse generators 40 and 45, and pulse counters 41 and 46. Pulse generator 40 may have a frequency $f_1$ of 100 cycles, for example, and pulse generator 45 may have a frequency $f_2$ of 1000 cycles, for example.

Three characteristic curves of a working diagram of pressure moulding machines are represented in FIGS. 2a, 2b, and 2c. In each of these diagrams the abscissa values are the momentary positions of the stamp 12 movable into the filling box 10 in FIG. 1. $s_0$ indicates the starting position of the stamp 12, $s_1$ the position after the so called slow injection stroke has been covered and $s_2$ the final position after the mould cavity has been completely filled up, whereby the course $s_1$–$s_2$ can be designed as the mould filling piston course.

In FIG. 2a, the consecutive time values $t_0$, $t_1$, $t_2$ are indicated as ordinate values, which are adjoined to the three particular abscissa values $s_0$, $s_1$, $s_2$.

In FIG. 2b, the displacement speeds $v_0$, $v_1$, $v_2$ of the stamp 12 are indicated as ordinates for the three particular abscissa values.

Finally, in FIG. 2c, the pressure powers $p_0$, $p_1$, $p_2$ acting on the injection piston 14 are indicated for the three particular abscissa values.

The diagrams of FIGS. 2a–2c show that the stamp 12 is pushed into the filling box 10 from the starting position $s_0$ to the position $s_1$ with a constant slow speed $v_1$ corresponding to the injection slow speed up to the blocking of the filling opening 11.

To reach the position $s_1$ the stamp 12 needs, after the start in the position $s_0$, the time $t_1$ designed as injection slow time.

When the stamp 12 arrives at the working position $s_1$, the pressure in the working space 16 of the injection cylinder increases from the previous small value $p_0$ to the very higher value $p_1$, since the filling box 10 is still essentially completely filled with casting material.

When the stamp 12 has attained this positon $s_1$, the feeding of the pressure medium to the injection cylinder 15 is set at a higher value by the adjustment of the valve 24, so that the stamp 12 is displaced in the direction of the mould 1 under this pressure $p_1$ and with an increased speed $v_2$, till the mould 5 is completely filled with casting material. At this moment the stamp 12 is in its final position $s_2$. The speed of the stamp falls to zero and the pressure of the pressure medium in the working space 16 rises suddenly to the top value $p_2$. The stamp 12 attains the final position $s_2$ at the time $t_2$, whereby the difference between the times $t_2-t_1$ is considerably smaller than the difference between the times $t_1-t_0$.

The favorable formation of this working diagram with regard to faultless manufacturing of perfect casting pieces is the result of theoretical calculations and practical preliminary tests. The control elements of the control valve 23 and the adjustable throttle valve 24 are set correspondingly. These values should be compiled into a formula for a determined casting piece which should be reproducible in any number.

But now it is proved that, for a mass production of such pre-settled working operation, the constant manufacturing of perfect casting pieces is not possible. This can be attributed to various non-influenceable modifications of various and effective operation circumstances, for instance the temperature and consequently viscosity alteration of the pressure medium, the temperature of different machine parts, or of replaced parts like a new injection piston etc.

It is proved that the exact observance of a favourable working diagram is important for each moulding operation. This can be preferably obtained through the exact observance of the nominal times resulting from the diagram according to FIG. 2a, namely the injection slow time $t_1-t_0$, for the movement of the stamp 12 from the initial position $s_0$ to the position $s_1$ and the mould filling time $t_2-t_1$, i.e. for the movement of the stamp 12 from the position $s_1$ to the final position $s_2$. Ascertained deviations of the determined time values $t_1-t_0$ and $t_2-t_1$ in relation to the corresponding nominal time values can be compensated manually or automatically by adjusting influenceable factors, for instance at the adjusting elements for the control valve 23 or for the throttle valve 24, securing the further exact observance of the favourable working diagram.

The measuring of the times $t_1-t_0$ and $t_2-t_1$ in the device according to FIG. 1 is made in the following way:

As soon as the stamp 12 is moved by the injection piston 14 and the piston rod 13, the trip cam 18, which is also displaced, immediately closes switch 30. Thereby the pulse counter 41 is connected, by means of this switch 30 and of the rest contact of the commutator 31, to the initial position of the pulse generator 40, and counts the impulses, which are immediately indicated decadically, with an impulse frequency of 100 cycles, in hundredths of seconds. When the stamp 12 reaches the position $s_1$ to which the commutator 31 has been adjusted, the trip cam 18 reverses the commutator 31, i.e. it breaks the feeding circuit for the pulse counter 41 and stops this counter.

Simultaneously, the pressure medium quantity to the cylinder 15 is increased by known means through the throttle valve 24 and, through the commutation of the switch 31 the electric circuit, from the initial position of the pulse generator 45 over the switch 47 adjoined to the pressure indicator 25 and the working contacts of the commutator 31 to the pulse counter 46, is closed. Owing to the higher pulse frequency of 1000 cycles, the considerable shorter mould filling time $t_2-t_1$ is indicated at the pulse counter 46 in thousandths of seconds. At the moment of the second pressure increasing from $p_1$ to $p_2$, the sliding contact 49 is driven out of the range of the contact rail 48 and stops, through the resultant circuit interruptions, the pulse counter 46. Before the beginning of a new injection of casting material into the mould 1, when the stamp 12 is again in the initial position $s_0$, both the pulse counters 41 and 46 are put back to the neutral position by means of the release interruptor 50 in the feeding circuit of both the pulse generators 40 and 45.

By means of this device it is possible to determine, very quickly in a simple way and separately, the injection slow time $t_1-t_0$ and the mould filling time $t_2-t_1$ for each injection. Deviations from the working diagram, if such occur, are immediately indicated, and modifications in the regulation of the machine can be effected immediately and correctly, reducing rejected pieces to a minimum. Through this device, it also is possible to erect a clear operation formula, obtaining for each piece reproducible working conditions.

While the device according to FIG. 1 presumes particularly ideal working conditions of the switches 30 and 31, i.e. that no back-strokes of these switches occurs and that the commutator 31 works with negligible reversing times, FIG. 3 shows a device for the measuring of both the times $t_1-t_0$ and $t_2-t_1$, for the slow injection and for the mould filling, respectively, with static, so-called electronic control elements among such as transistor switches and transistor accumulators. The double throw switch 31 is replaced by a simple limit switch 31', and the trip cam 18' is formed like a ring seating on the piston rod 13.

A rectifier 55 and both pulse generators 40 and 45 are connected to a current network $U_N$ with a frequency $f_0$, through a release interruptor 50. Two impulse accumulators 51 and 56 and two so-called AND gates 61 and 66 are connected in the well-known manner to rectifier 55 with a negative tension $-U$, for instance $-20$ v., a no-voltage 0 and a positive tension $+U$, for instance $+6$ v.

The impulse generators 51 and 56 and the AND gates 61, 66 are developed as known transistor switches and contain no mechanical contacts. Consequently they are called static control elements.

In the position of the movable elements represented in FIG. 3, AND gate 61 blocks current flow to impulse generator 40 and impulse counter 41, and AND gate 66 blocks current flow to impulse generator 45 and impulse counter 46, this being due to the fact that the associated impulse generators 51 and 56, respectively, are in a non-conducting condition. As soon as the trip cam 18' operates switch 30, which applies the initial negative potential $-U$ of the rectifier 55 to the input L of the impulse accumulator 51, and this only for a short moment, accumulator 51 becomes in the conducting condition, so that the associated AND gate 61 conducts potential $-U$, creating the required conditions for the counting of the impulses of the generator 40 by the counter 41. The impulse accumulator 51 remains in the conducting condition until the potential $-U$ is also applied at its second input O. This is the case when the trip cam 18' reaches the switch 31', which is adjusted to the position $s_1$. Even a brief closure of the switch 31' applies potential $-U$ to the input O of the impulse accumulator 51 and simultaneously to the input L of the impulse generator 56. Therefore, the impulse accumulator 51 is returned to the cut-off condition so that the AND gate 61 blocks, from this moment, application of impulses from the generator 40 to the pulse counter 41. Each AND gate 61 or 66 supplies an output signal only if the signals coming from the output of accumulator 51 or 56 as well as from the generator output 40 or 45 reach both its inputs simultaneously. Since the impulse accumulator 51 is returned into the cut-off condition at the same time as the impulse accumulator 56 is placed in the conducting condition, the counting of the impulses of the generator is done, from this moment $t_1$, by the counter 46.

If after the termination of the mould filling the working pressure acting on the injection piston 14 exceeds suddenly the value set on the pressure indicator 25', the contact 49', coupled with the pressure indicator 25', and the correspondingly set counter contact 48', of the pressure switch 47', apply the output potential $-U$ of rectifier 55 momentarily to the input L of the impulse accumulator 56, with the result that the accumulator 56 is returned to the cut-off condition, blocking further supply of impulses of the generator 45 through AND gate 66 to the pulse counter 46.

After termination of the mould filling, i.e. when the stamp 12 reaches its end position $s_2$, the counter 41 indicates the slow injection time $t_1-t_0$ in hundredths of a second and the counter 46 indicates the mould filling time $t_2-t_1$ in thousandths of a second, whereby the possible back-strokes of the switches 30 and 31' have no influence on the indicated times and the commutation, from one counter to the other, at the passage of the position $s_1$, and of the switch 31' through the trip cam 18', is made without time-lag.

During the backward movement of the stamp 12 to its initial position, the release interruptor 50 is opened, with the effect that all current circuits are interrupted, the pulse counters 40, 45 are switched off, the impulse accumulators 51, 56 remain in the cut-off condition and the counters 41, 46 are set back on 000.

The operating times of the switches 30', 31' are equal for each injection, so that its measure can be neglected.

For the example represented in the FIGS. 1 and 3, it was presumed that the dosage of the casting material into the filling box varies in a large range, so that the stamp is not always pushed in the same distance for the different injections. Therefore a pressure controlled switch 47 respectively 47' has been provided to stop the second pulse counter 46. As demonstrated through experience, the difference $\Delta s_f$ (FIG. 4) between a minimum course of the stamp, $s_2$ min., and a maximum course of the stamp, $s_2$ max. remain in a very close range. The time for covering the course $\Delta s_f$ is very short in relation to the mould filling time $t_2-t_1$ itself.

The execution example of the invention shown in FIG. 4 presents only small alterations with regard to the execution example shown in FIG. 3. Instead of a switch 47' operated by the pressure indicator 25' in dependence on a suddenly increasing pressure, a simple limit switch 32 is mounted at a point $s_2$ min. which is reached by the trip cam 18' at least at each mould filling operation. This limit switch 32 has the same effect as the switch 47', namely the return of the impulse accumulator 56 to the cut-off condition and consequently the interruption of the impulse counting by the counter 56 for the time measuring of the mould filling. This is admissible, considering the above mentioned negligible influence of a possible further advance of the stamp 12 to an end position $s_2$ max. which is only prolonged by the small amount $\Delta s_f$, and presents the advantage that a simpler limit switch can be applied instead of a more complicated manometer-switch. Furthermore, in the example according to FIG. 4, only one impulse generator 45 with a frequency $f_2=1000$ cycles is provided for the feeding of both counters 41' and 46. Correspondingly, the counter 41', which consequently indicates the measured time in thousandths of seconds, has one more decade position than does the counter 41 in FIG. 1, taking into account the larger value of the slow injection time $t_1-t_0$ with regard to the mould filling time $t_2-t_1$.

Instead of the mechanical electrical switches 30, 31, 32, 47 in the represented and specified execution examples, it is also possible to provide photo-cell switches, or capacitive or inductive switches. Under certain circumstances it would furthermore be possible not to make use of electrical time measuring devices to measure the slow injection time $t_1-t_0$ and the mould filling time $t_2-t_1$, but to use mechanical stop-watches which could, for instance, be started and stopped by a control element which would be moved together with the stamp 12, by means of releaser, for instance a wire releaser like those used for photo-apparatus and located at the corresponding points $s_0$, $s_1$ and $s_2$.

For certain relative simple casting operations, it may be sufficient if the injection time is not divided into two periods, namely slow injection time $t_1-t_0$ and mould filling time $t_2-t_1$, but considered only as total injection time $t_2-t_0$ by suitable and simpler injection time measuring means.

What is claimed as new and desired to be protected by Letters Patent is:

1. A pressure injection moulding machine comprising a mould, a piston operable to fill said mould with material, means controlling said piston in accordance with a preset operation diagram so that movement of said piston occurs during a first slow injection period and a second mould filling period, adjustable control elements for presetting said operation diagram, and time measuring means operatively associated with said piston, and controlled thereby during each injection stroke, for measuring the time duration of piston movement during each injection stroke.

2. A pressure injection moulding machine as claimed in claim 1 wherein first and second switch means are actuated by said piston for controlling said measuring means, said first switch means being actuated by said piston at the start of said slow injection period and said second switch means being actuated responsive to said piston reaching a position corresponding to the end of said mould filling period.

3. A pressure injection moulding machine as claimed in claim 2 and including a pressure indicator responsive to the pressure of said material in said mould, and means operatively connecting said second switch means to said pressure indicator to actuate said second switch means upon said pressure reaching a set figure commensurate with said mould being full.

4. A pressure injection moulding machine as claimed in claim 3 wherein said pressure indicator and said operatively connecting means are adjustable to vary said set figure at which said second switch means is actuated.

5. A pressure injection moulding machine as claimed in claim 2 and including means mounting said second switch means at a point along the path of said piston, said point representing said position of minimum advance of said piston ensuring filling of said mould, and a part associated with said piston and actuating said second switch means when said piston reaches said position of minimum advance.

6. A pressure injection moulding machine as claimed in claim 2 and including third switch means actuated by said piston at the end of said slow injection period, and wherein said measuring means comprise first and second measuring means measuring, respectively, said slow injection period and said mould filling period.

7. A pressure injection moulding machine as claimed in claim 6 wherein said third switch means is a two-position change over switch having a first position in which said first measuring means is operative and a second position in which said second measuring means is operative.

8. A pressure injection moulding machine as claimed in claim 6 and including means independently controlling said first and second measuring means.

9. A pressure injection moulding machine as claimed in claim 6 wherein said first and second measuring means comprise first and second pulse counters, and including constant frequency pulse generating means, a first circuit connecting said constant frequency pulse generating means to said first pulse counter through said first and third switch means, and a second circuit connecting said constant frequency pulse generating means to said second pulse counter through said second and third switch means.

10. A pressure injection moulding machine as claimed in claim 9 wherein said first and second circuits include static switching elements.

11. A pressure injection moulding machine as claimed in claim 10 wherein said static switching elements comprise an impulse accumulator and an AND gate in each of said first and second circuits.

12. A pressure injection moulding machine as claimed in claim 6 wherein said first and second measuring means comprise first and second pulse counters, and including first and second constant frequency pulse generating means, a first circuit connecting said first constant frequency pulse generating means to said first pulse counter through said first and third switch means, and a second circuit connecting said second constant frequency generating means to said second pulse counter through said second and third switch means.

13. A pressure injection moulding machine as claimed in claim 12 wherein said first and second circuits include static switching elements.

14. A pressure injection moulding machine as claimed in claim 12 wherein said static switching elements comprise an impulse accumulator and an AND gate in each of said first and second circuits.

15. A pressure injection moulding machine comprising a mould, a piston operable to fill said mould with material, means controlling said piston in accordance with a preset operation diagram so that movement of said piston occurs during a first slow injection period and a second mould filling period, adjustable control elements for presetting said operation diagram, first, second and third switch means operatively associated with said piston, and controlled thereby during each injection stroke, said first switch means being actuated by said piston at the start of said slow injection period, said second switch means being actuated responsive to the piston position at the end of said mould filling period, and said third switch means being actuated by said piston at the end of said slow injection period, first and second pulse counters, first and second constant frequency pulse generating means, a first circuit including said first pulse counter, said first constant frequency pulse generating means and said first and third switch means, and whereby said first constant frequency pulse generating means is connected to said first pulse counter during said slow injection period, and a second circuit including said second pulse counter, said second constant frequency pulse generating means and said second and third switch means, and whereby said second constant frequency pulse generating means is connected to said second pulse counter during said mould filling period.

References Cited

UNITED STATES PATENTS

| | | | |
|---|---|---|---|
| 2,627,087 | 2/1953 | Hendry | 18—30 XR |
| 2,671,247 | 3/1954 | Lester | 18—30 |
| 2,896,279 | 7/1959 | Nyselius | 22—68 |
| 3,025,568 | 3/1962 | Hardy | 18—30 |

J. SPENCER OVERHOLSER, *Primary Examiner.*

W. L. McBAY, *Examiner.*